(12) United States Patent
Hubert et al.

(10) Patent No.: US 11,385,111 B2
(45) Date of Patent: Jul. 12, 2022

(54) SYSTEM AND METHOD FOR DETERMINING BEARING PRELOAD BY VIBRATION MEASUREMENT

(71) Applicant: Aktiebolaget SKF, Gothenburg (SE)

(72) Inventors: Mathieu Hubert, Torino (FR); David Christopher Rybski, White Lake, MI (US)

(73) Assignee: Aktiebolaget SKF, Gothenburg (SE)

( * ) Notice: Subject to any disclaimer, the term of this patent is extended or adjusted under 35 U.S.C. 154(b) by 71 days.

(21) Appl. No.: 16/952,128

(22) Filed: Nov. 19, 2020

(65) Prior Publication Data
US 2021/0181047 A1    Jun. 17, 2021

(30) Foreign Application Priority Data

Dec. 16, 2019   (IT) .......................... 102019000024030

(51) Int. Cl.
*G01L 1/10*    (2006.01)
*G01L 5/00*    (2006.01)
*F16C 25/08*    (2006.01)

(52) U.S. Cl.
CPC ............ *G01L 5/0009* (2013.01); *F16C 25/08* (2013.01); *G01L 1/10* (2013.01); *F16C 2233/00* (2013.01); *F16C 2240/14* (2013.01)

(58) Field of Classification Search
CPC .......... G01L 5/0009; G01L 1/10; F16C 25/08; F16C 2233/00; F16C 2240/14; G01M 13/045
See application file for complete search history.

(56) References Cited

U.S. PATENT DOCUMENTS 5,341,569 A * 8/1994 Takamizawa ........... F16C 25/06
5,877,433 A * 3/1999 Matsuzaki ............ F16C 19/186
                                              73/862.01
(Continued)

FOREIGN PATENT DOCUMENTS

CN        110146288 A      8/2019
EP          2662223 A1    11/2013
WO     2015/084636 A1     6/2015

*Primary Examiner* — Freddie Kirkland, III
(74) *Attorney, Agent, or Firm* — Garcia-Zamor Intellectual Property Law; Ruy Garcia-Zamor; Bryan Peckjian

(57) ABSTRACT

A method of determining bearing preload by vibration measurement including mounting the bearing on a vibration tester, the outer ring clamped preventing rotation, mounting a sensor proximate the outer ring to measure vibration, the bearing inner ring rotated to excavate eigen-frequencies, the measured vibration data transmitted from the sensor to a computer workstation, the computer workstation performs a numerical FFT transforming data to Frequency Domain, spectral data from the FFT analyzed with the computer workstation, a peak detection algorithm determines the peaks that are the various modes of the outer ring, the modes are sorted and main modes identified, numerical relationship is obtained for each mode between the resonance and preload, the mode relationships are compared to one or more references, a match between the numerical relationships for each mode and the ideally referenced graph modes indicates a correct preload is determined. Also, a system for carrying out the method.

15 Claims, 6 Drawing Sheets

(56) References Cited

U.S. PATENT DOCUMENTS

| | | | | |
|---|---|---|---|---|
| 6,286,374 B1* | 9/2001 | Kudo | ............... | G01M 13/045 |
| | | | | 73/581 |
| 7,320,257 B2* | 1/2008 | Takizawa | ............... | B60B 27/00 |
| | | | | 73/862.541 |
| 9,791,856 B2* | 10/2017 | Hatch | ............... | G05B 23/0235 |
| 10,168,248 B1* | 1/2019 | Morey | ............... | G01M 13/045 |
| 10,203,242 B2* | 2/2019 | Hedin | ............... | G05B 23/024 |
| 11,054,301 B2* | 7/2021 | Hedin | ............... | G05B 23/024 |
| 2006/0070462 A1* | 4/2006 | Takizawa | ............... | B60B 27/00 |
| | | | | 73/862.541 |
| 2013/0298680 A1* | 11/2013 | Inoue | ............... | B60B 27/00 |
| | | | | 73/593 |
| 2014/0142872 A1* | 5/2014 | Hedin | ............... | G05B 23/024 |
| | | | | 702/56 |
| 2014/0214363 A1* | 7/2014 | Hatch | ............... | G05B 19/4065 |
| | | | | 702/181 |
| 2019/0271584 A1* | 9/2019 | Hedin | ............... | G01H 1/003 |

* cited by examiner

SYSTEM AND METHOD FOR DETERMINING BEARING PRELOAD BY VIBRATION MEASUREMENT

TECHNOLOGICAL FIELD

This invention relates to a system and method of determining bearing preload by vibration measurement. More particularly, this invention relates to a system and method of determining bearing preload by sensing vibration on an outer ring of a bearing and comparing the sensed vibration data to ideally referenced data.

BACKGROUND OF THE INVENTION

Wheel bearing internal preload has an important impact on the several key performances of the final product:
  Friction
  Life
  Stiffness
  NVH (noise)

However, internal preload can't be measured in a direct way and it is a challenge to be able to extract the product preload. In addition, for quality purpose, a preload measurement should fit in the cycle time of the production channel to avoid additional cost.

Today, the industry is using two methods to check the preload, one based on a spacer inserted into the product (intrusive, long) and a second one based on the stiffness measurement of the part under axial loads with a correlation with a numerical model. The second method is faster than the original one. However the industry is facing a lot of challenges to have this equipment repeatable and fast enough to be integrated in a channel.

The preload has an impact on the stiffness of the bearing product and thus on the natural vibration frequency of it. The concept disclosed in the present invention is to use the vibration response of the product and compare it with a calibrated chart and with a numerical model to identify the internal preload.

SUMMARY OF THE INVENTION

According to a first aspect, an exemplary embodiment relates to a method of determining bearing preload by vibration measurement. The method comprises the steps of providing a bearing having an inner ring, an outer ring, and at least two rows of rolling elements, mounting the bearing on a mounting fixture disposed on a bearing noise and vibration tester, the mounting fixture having a rotating arbor attached thereto, the rotating arbor provided to rotate the inner ring of the bearing at predetermined rates, wherein the bearing rotation creates vibrational noise on the outer ring, mounting the outer ring of the bearing with a clamping and autorotation device in order to prevent the outer ring from rotating when the bearing inner ring is rotated, wherein the force that clamps the outer ring is preferably configured to be unequal to the internal bearing preload, mounting a sensor proximate the outer ring of the bearing in order to measure and record the outer ring vibration at predetermined rotation rates, rotating the bearing on the arbor at a steady state speed configured to excavate eigen-frequencies of the outer ring, transmitting the measured vibration data from the sensor to a computer workstation, the computer workstation having a software analysis package, the software analysis package performing a numerical Fast Fourier Transform (FFT) of the data to transform it into a Frequency Domain, analyzing the spectral data from the FFT with the computer workstation, the software analysis package employing a peak detection algorithm to determine the peaks of the amplitude data in the frequency domain, wherein the peaks are various modes of the outer ring, sorting the modes and identifying the main or dominant modes with the peak detection algorithm, the number of modes selected is based upon design selection, obtaining a numerical relationship for each mode between the resonance and the preload, wherein a polynomial curve is fit to data points or to a look up table, comparing the mode relationships or graphed polynomial curves to one or more references, wherein the one or more references for the bearing is an ideally referenced graph, wherein a match between the numerical relationships for each mode and the ideally referenced graph modes indicates a correct preload has been determined.

According to a second aspect, the method provides acquiring data at a sampling rate of at least twice the maximum frequency is preferred.

According to a third aspect, the method further provides rotating the bearing at a constant speed of 700 rpm.

According to a further aspect, the method further provides rotating the bearing in a range from 100 rpm to 2000 rpm.

According to a further aspect, the method further provides a clamping force that is preferably either less than or greater than the internal preload ideally achieves a more linear relationship for a mode between the bearing preload and a frequency at which the bearing is rotated.

According to a further aspect, the method further provides measuring vibration of the outer ring with a laser, wherein the laser does not physically contact the outer ring, According to a further aspect, the method further provides the sensor as being one of a laser vibrometer, an accelerometer and a coil vibrometer.

According to a further aspect, the method further provides identifying at least one mode in order to insure a minimum accuracy of the bearing preload determination.

According to a further aspect, the method further provides obtaining the ideally referenced graph being provided by at least one of a calibrated chart stored within a memory on board the computer workstation, by simulation and by measurement of known bearings, and by transfer function.

According to a further aspect, the method further provides optimizing signal quality being obtained by measuring vibration on a machined surface and on a non-rotating elements.

According to a further aspect, the method further provides the outer ring vibration at predetermined rotation rates is accomplished by measuring and recording at least one of a position, velocity and an acceleration movement.

According to a further aspect, the method further provides measuring a wheel bearing unit being done with a laser on the outer ring on one of an inboard or an outboard surface.

According to a further aspect, the method further provides the surfaces allowing easy access to the surface with a distance laser unit even with complex loading and clamping devices.

According to another exemplary embodiment a system for determining bearing preload by vibration measurement. The system comprises a bearing having an inner ring, an outer ring, and at least two rows of rolling elements, the bearing being mounted on a mounting fixture that is disposed on a bearing noise and vibration tester, the mounting fixture having a rotating arbor attached thereto, the rotating arbor provided to rotate the inner ring of the bearing at predetermined rates, wherein the bearing rotation creates vibrational noise on the outer ring, the outer ring being fixed by a clamping and antirotation system in order to prevent the outer ring from rotating when the bearing inner ring is rotated, wherein the force that clamps the outer ring is preferably configured to be unequal to the internal bearing preload, a sensor is disposed proximate the outer ring of the bearing in order to measure and record the outer ring vibration, wherein the outer ring vibration is as at least one of a position, velocity and an acceleration movement at predetermined rotation rates, the bearing being rotated on the arbor at a speed of 700 rpm that is configured to excavate eigen-frequencies of the outer ring, the measured vibration data is transmitted from the laser to a computer workstation, the computer workstation providing a software analysis package, the software analysis package performing a numerical Fast Fourier Transform (FFT) of the data to transform it into a Frequency Domain, the spectral data from the FFT is analyzed with the computer workstation, the software analysis package employs a peak detection algorithm to determine the peaks of the amplitude data in the frequency domain, wherein the peaks are the various modes of the outer ring, the modes are sorted and the main or dominant modes are identified with the peak detection algorithm, the number of modes selected is based upon design selection, a numerical relationship is obtained for each mode between the resonance and the preload, wherein a polynomial curve is fit to data points or to a look up table, the mode relationships or graphed polynomial curves are compared to one or more references, wherein the one or more references for the bearing is an ideally referenced graph, wherein a match between the numerical relationships for each mode and the ideally referenced graph modes indicates a correct preload is determined.

According to a further aspect of the system for determining bearing preload by vibration measurement, the system further providing the bearing being mounted in a wheel hub and the inner ring being rotated via the mounting studs.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
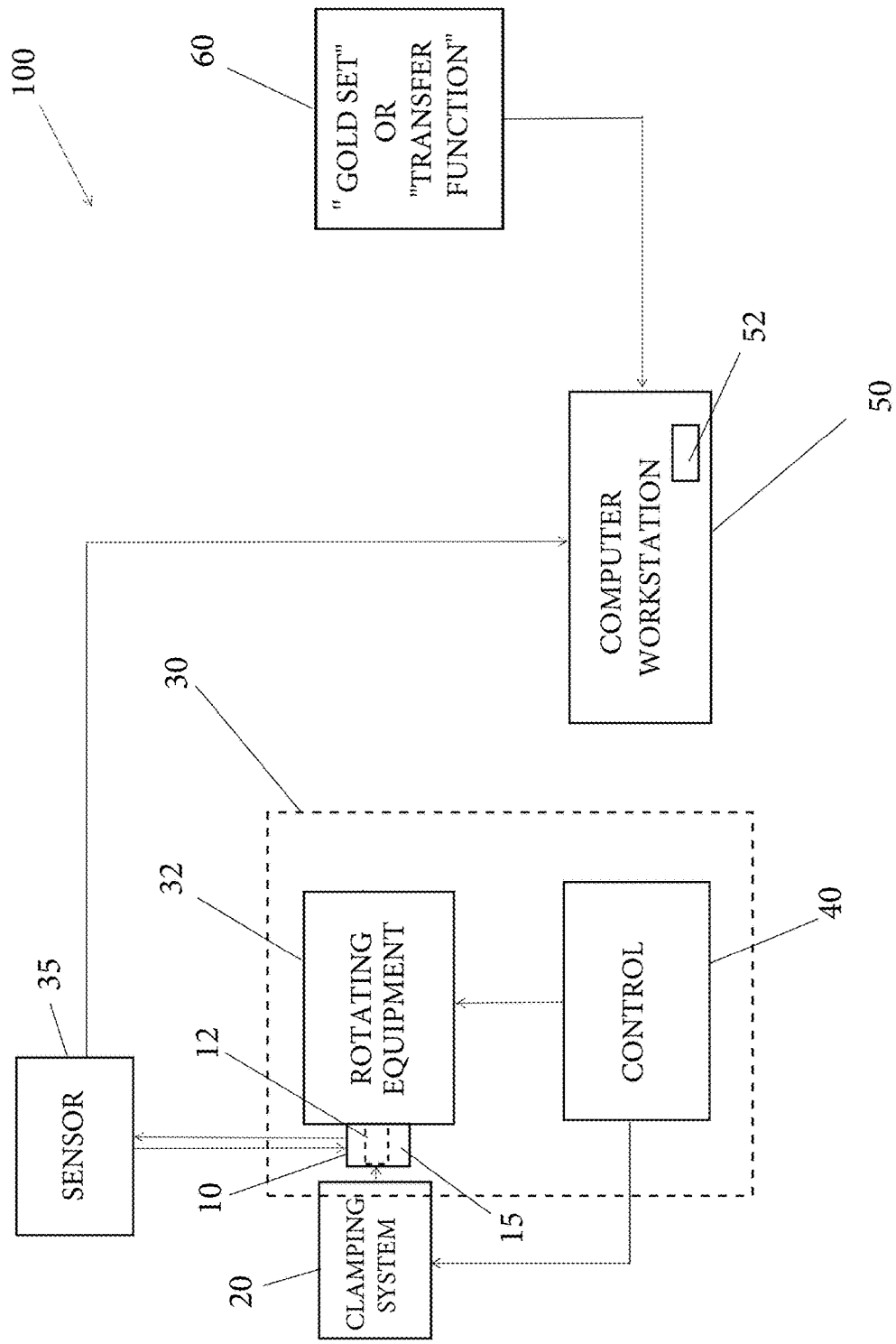
FIG. 1 is a schematic view of a system for determining bearing preload by vibration measurement according to a first embodiment of the present invention.

For purposes of description herein, the terms "inward," "outward," "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

System

A system 100 for determining bearing preload by vibration measurement is illustrated in FIG. 1. The system 100 provides a bearing 10 that is mounted on a mounting fixture 20 or clamping system. The bearing 10 includes an outer ring 15, an inner ring 17, and at least two rows of rolling elements 19. See also FIGS. 2, 3.

The mounting fixture 12 is disposed on a bearing noise and vibration tester 30. The bearing noise and vibration tester 30 includes rotating equipment 32 and a control 40 with associated electronics for controlling the function of the tester 30. The rotating equipment 32 includes a rotating arbor 12 attached thereto. The outer ring 15 of the bearing 10 is rigidly clamped onto a clamping system 20. This is done to prevent the outer ring 15 from rotating when the inner ring 17 of the bearing 10 is rotated. That is, the clamping load on the outer ring is preferably smaller or larger than the internal preload to be measured. This will allow a relationship between preload/eigenfrequencies to be more linear. The clamping OR autorotation system 20 are provided to ensure the outer ring is static while the inner ring is rotating.

The rotating arbor 12 is provided in order to rotate the inner ring 17 of the bearing 10. The inner ring 17 of the bearing 10 is rotated at predetermined rates.

When the inner ring 17 of the bearing 10 is rotated at the predetermined rates, the bearing rotation creates vibrational noise on an outer ring 15 of the bearing 10. As will be further disclosed, the frequency of the noise created is used to determine the preload.

A sensor 35 is disposed proximate the outer ring 15 of the bearing 10 in order to measure and record vibration on the outer ring 15. The outer ring 15 vibration may be provided as being at least one of a position/displacement, a velocity and an acceleration movement at the predetermined rotation rates. As such, the sensor may be provided as being one of a laser vibrometer (velocity), an accelerometer (acceleration) and a coil vibrometer. The coil vibrometer and laser vibrometer both measure velocity. However, the coil vibrometer needs to be in contact with the surface of the product and enough space must be available to have it reaching the surface. The laser vibrometer does not need to contact the bearing, only with the laser beam. This makes measurement possible even when the surface of the outer ring is difficult to reach. In addition, the laser vibrometer can stay static between measurement and the coil vibrometer cannot. The system to move the coil vibrometer is then more complex and with higher risk of issues.

Figure 2:
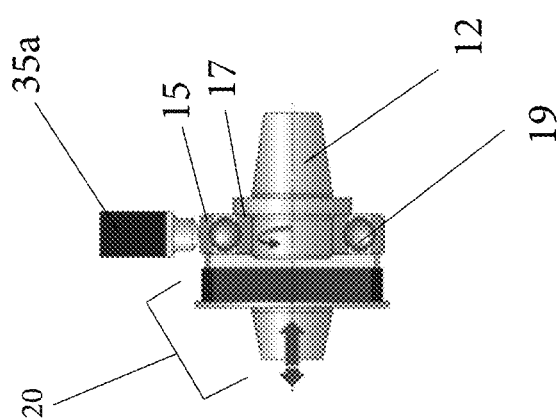
FIG. 2 is a side view of a profile sensor in contact with a bearing outer ring and mounted to an arbor according to the system of FIG. 1.
Figure 3:
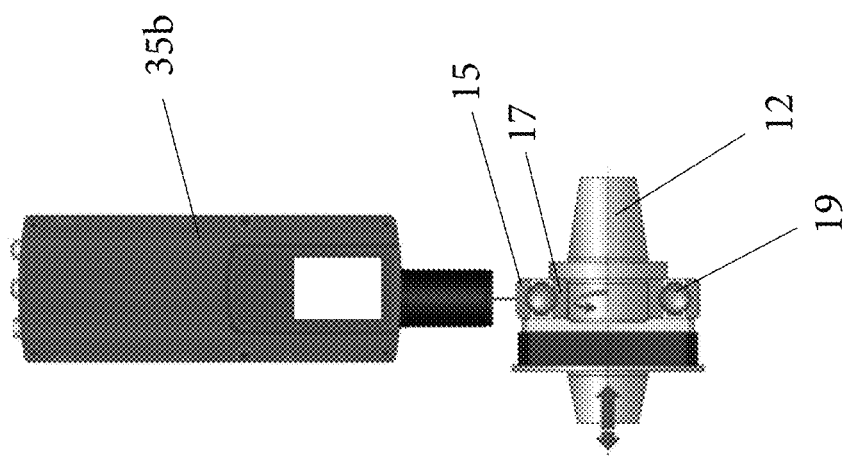
FIG. 3 is a side view of a laser vibrometer sensing a bearing outer ring and mounted to an arbor according to the system of FIG. 1.
Figure 4:
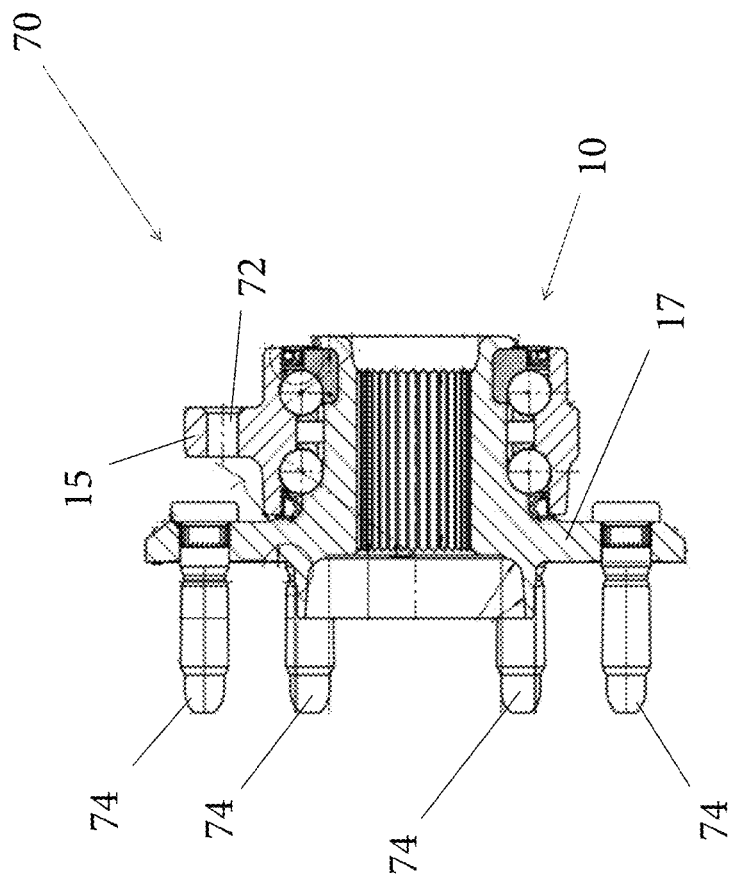
FIG. 4 is a cross-sectional view of a wheel hub bearing assembly according to the system of FIG. 1.

FIG. 2 shows the sensor 35a providing a coil vibrometer having a stylus that is in physical contact with the outer ring 15 of the bearing 10. FIG. 3 shows the sensor 35b providing a laser vibrometer that is not in contact with the outer ring 15 of the bearing 10. FIG. 4 illustrates the bearing 10 being mounted in a wheel hub 70 and the inner ring 17 being rotated via the mounting studs 74. The outer ring being clamped by at least one bolt screwed through mounting hole 72. In order to optimize signal quality, the measurement is done on a machined surface and on a non-rotating elements. For the wheel bearing unit, the measurement is done on the outer ring, on the inboard or on the outboard surface. These surfaces allow easy access to the surface with a distance laser unit even with complex loading and clamping devices.

Data is preferably acquired at a sampling rate of at least twice the maximum frequency. Here, the bearing is rotated at a constant speed of 700 rpm. The data is recorded with a minimum of 5 rotations at the steady state speed.

It should be noted that the force that clamps the outer ring is preferably configured to be unequal to the internal bearing preload. As previously disclosed, the clamping load on the outer ring is preferably smaller or larger than (but not equal to) the internal preload to be measured. This allows the relationship preload/eigenfrequencies when plotted to be more linear.

Here, the measured vibration data is transmitted from the laser 35 to a computer workstation 50. The computer workstation 50 provides a software analysis package 52. The software analysis package 52 is capable of performing a numerical Fast Fourier Transform (FFT) of the data to transform it into a Frequency Domain.

Figure 5:
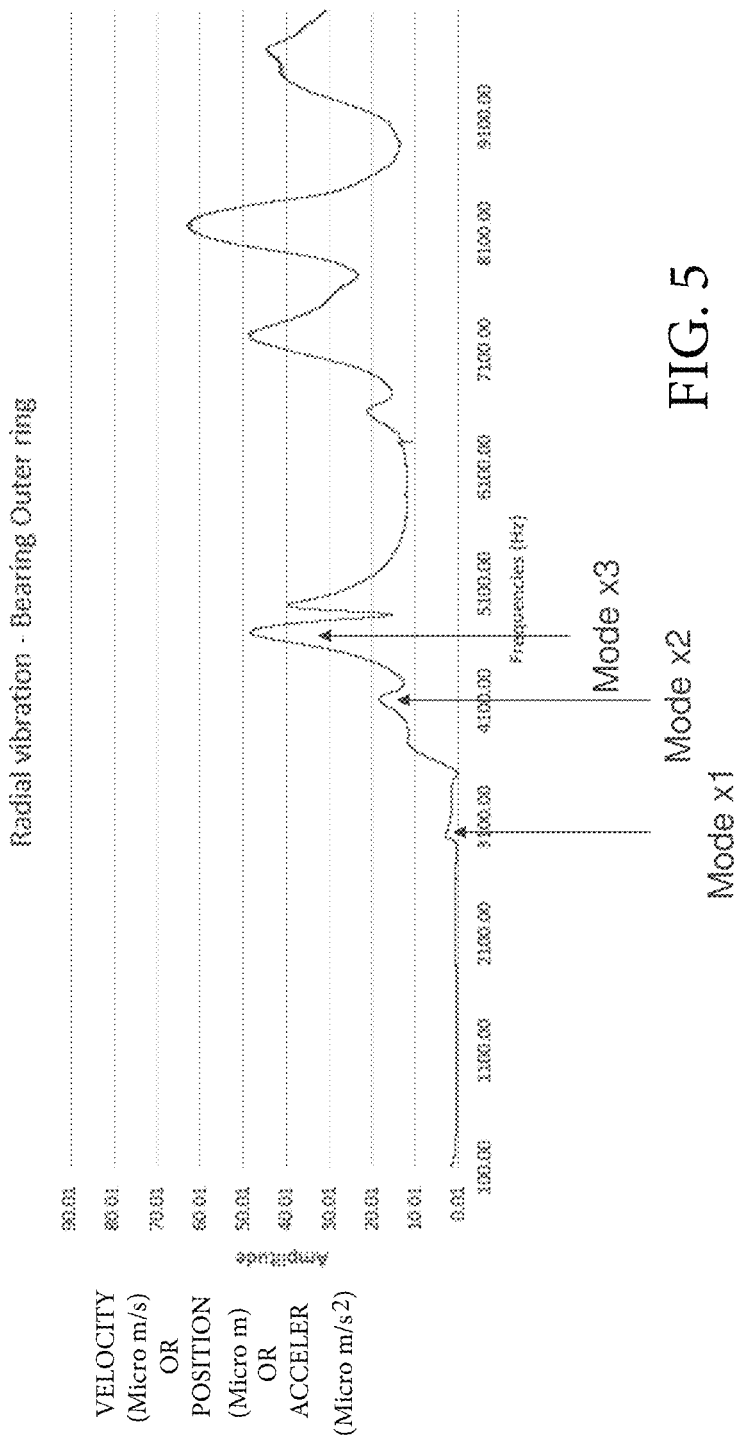
FIG. 5 are graphs of frequency versus preload according to the system of FIG. 1.

The spectral data from the FFT is analyzed with the computer workstation 50. The software analysis package 5 employs a peak detection algorithm to determine the peaks of the amplitude data in the frequency domain. FIG. 5 shows the peaks and modes that are determined via the algorithm generated. The modes are sorted and the main or dominant modes are identified with the peak detection algorithm. The number of modes selected is based upon design selection, but at least one mode is required to be selected. Here, the peaks or mode 1, mode 2, mode 3 and mode 4 are the various modes of the outer ring with respect to amplitude versus frequency. The frequencies of the OR (outer ring) are measured and analyzed and at these frequencies, the mode shapes of the OR are observed for opalization, tilting, etc. . . . .

Figure 6:
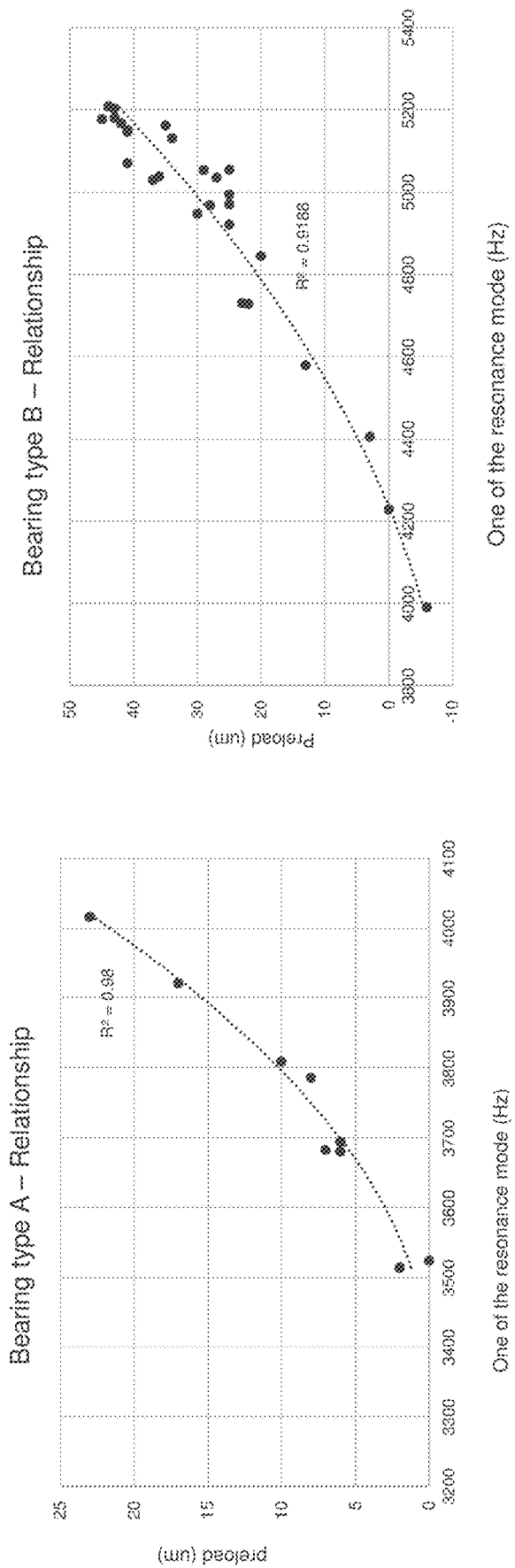
FIG. 6 is a graph of vibration modes of a bearing under preload according to the embodiment of FIG. 1.

There is shown in FIG. 6 a numerical relationship is obtained for each mode between the resonance and the preload. Here, a polynomial curve is fit to data points or to a look up table. The mode relationships or graphed polynomial curves are compared to one or more references.

The one or more references for the bearing is an ideally referenced graph. The data for the ideally referenced graph may be provided by a simulation or by measurement of known bearings (where the preload has been measured by an existing method). The ideally referenced graph may also be provided by at least one of a calibrated chart stored within a memory on board the computer workstation, by simulation, and by measurement of a "Gold Set" of known bearings, the data of which is stored on a remote server 60.

Consequently, a match between the numerical relationships for each mode and the ideally referenced graph modes indicates a correct preload has been determined. Bearing Preload is desirable for quality control purposes. That is, whether to keep or reject a bearing and to evaluate a modification in the production process.

Method

Figure 7:
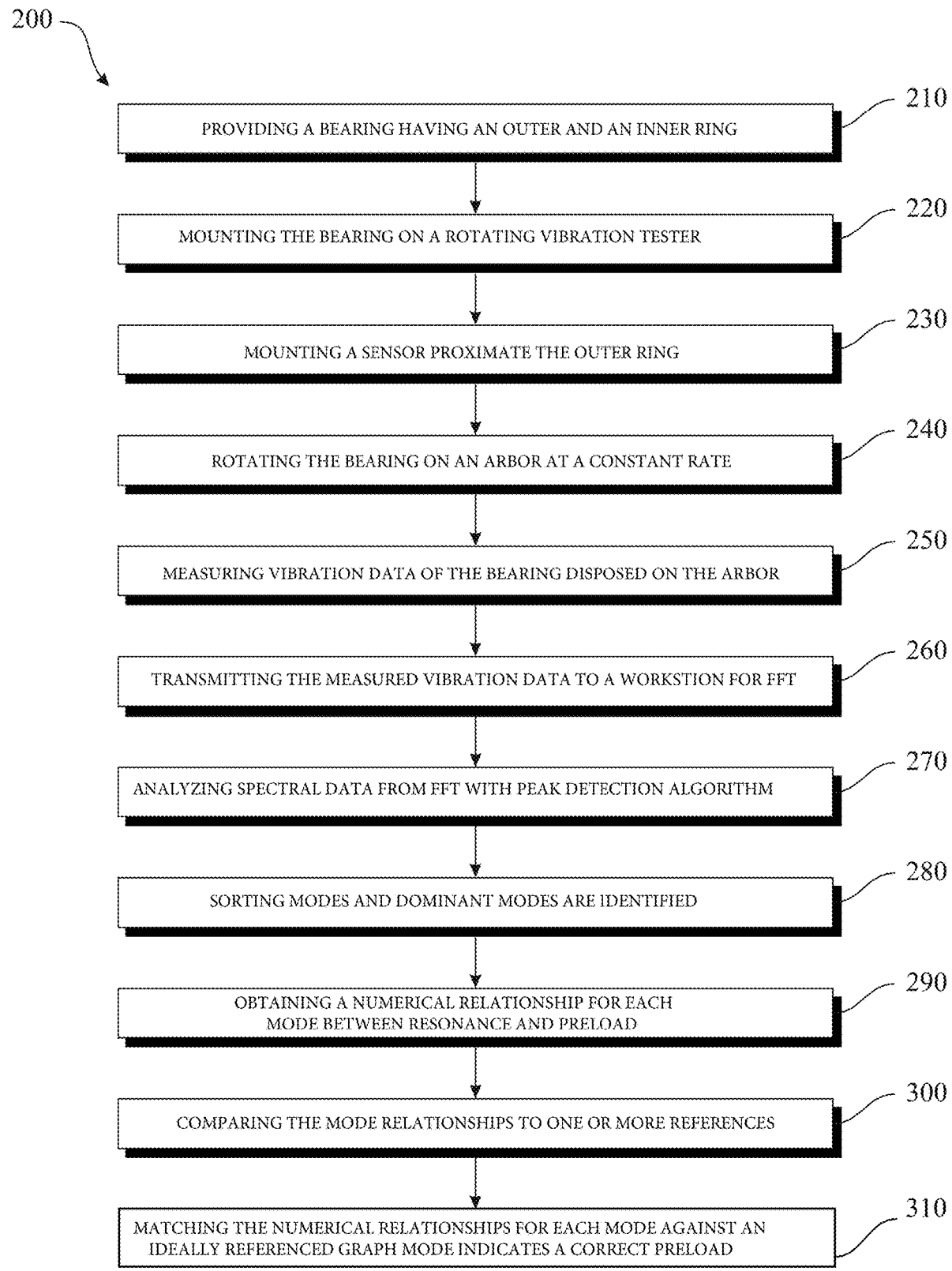
FIG. 7 shows the method steps for carrying out the function of the system according to the embodiment of FIG. 1.

A method 200 of determining bearing preload by vibration measurement is illustrated in FIG. 7.

The method includes a first step 210 of providing a bearing having an inner ring, an outer ring, and at least two rows of rolling elements.

A second step 220 of the method 200 includes mounting the bearing on a mounting fixture, which is disposed on the bearing noise and vibration tester. The mounting fixture having a rotating arbor attached thereto. The rotating arbor provided to rotate the inner ring of the bearing at predetermined rates. The bearing rotation creates vibrational noise on the outer ring.

In a step 230 the method provides mounting a sensor proximate the outer ring of the bearing in order to measure and record the outer ring vibration at predetermined rotation rates.

In a step 240, the method 200 provides rotating the bearing on the arbor at a constant speed of 700 rpm that is configured to excavate eigen-frequencies of the outer ring. In a step 250, the method provides measuring the noise or vibration data emanating from the outer ring of the bearing disposed on the arbor.

The method 200 provides a step 260 of transmitting the measured vibration data from the sensor to a computer workstation. The computer workstation having a software analysis package. The software analysis package performing a numerical Fast Fourier Transform (FPT) of the data to transform it into a Frequency Domain.

In a step 270, the method 200 provides analyzing the spectral data from the FFT with the computer workstation. The software analysis package employing a peak detection algorithm to determine the peaks of the amplitude data in the frequency domain. Here, the peaks are various modes of the outer ring.

In a step 280, the method 200 provides sorting the modes and identifying the main or dominant modes with the peak detection algorithm. Here, the number of modes selected is based upon design selection. Once again, a minimum of 1 mode is required in order to make a valid determination of the preload.

The method 200 provides a step 290 of obtaining a numerical relationship for each mode between the resonance and the preload. Here, a polynomial curve is fit to data points or to a look up table.

The method 200 provides a step 300 of comparing the mode relationships or graphed polynomial curves to one or more references. Here, the one or more references for the bearing is an ideally referenced graph.

In a step 310, the method 200 finally provides that a match between the numerical relationships for each mode and the ideally referenced graph modes indicates a correct preload has been determined.

Since many modifications, variations, and changes in detail can be made to the described preferred embodiments and methods of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A method of determining bearing preload by vibration measurement, the method comprising the steps of:
   providing a bearing having an inner ring, an outer ring, and at least two rows of rolling elements,
   mounting the bearing on a mounting fixture disposed on a bearing noise and vibration tester, the mounting fixture having a rotating arbor attached thereto, the rotating arbor provided to rotate the inner ring of the bearing at predetermined rates, wherein the bearing rotation creates vibrational noise on the outer ring,
   mounting the outer ring of the bearing with a clamping and autorotation device in order to prevent the outer ring from rotating when the bearing inner ring is rotated, wherein the force that clamps the outer ring is preferably configured to be unequal to the internal bearing preload,
   mounting a sensor proximate the outer ring of the bearing in order to measure and record the outer ring vibration at predetermined rotation rates,
   rotating the bearing on the arbor at a steady state speed configured to excavate eigen-frequencies of the outer ring,
   transmitting the measured vibration data from the sensor to a computer workstation, the computer workstation having a software analysis package, the software analysis package performing a numerical Fast Fourier Transform (FFT) of the data to transform it into a Frequency Domain,
   analyzing the spectral data from the FFT with the computer workstation, the software analysis package employing a peak detection algorithm to determine the peaks of the amplitude data in the frequency domain, wherein the peaks are various modes of the outer ring,
   sorting the modes and identifying the main or dominant modes with the peak detection algorithm, the number of modes selected is based upon design selection,
   obtaining a numerical relationship for each mode between the resonance and the preload, wherein a polynomial curve is fit to data points or to a look up table,
   comparing the mode relationships or graphed polynomial curves to one or more references, wherein the one or more references for the bearing is an ideally referenced graph,
   wherein a match between the numerical relationships for each mode and the ideally referenced graph modes indicates a correct preload has been determined.

2. The method of determining bearing preload by vibration measurement according to claim 1, acquiring data at a sampling rate of at least twice the maximum frequency is preferred.

3. The method of determining bearing preload by vibration measurement according to claim 1, further comprising rotating the bearing at a constant speed of 700 rpm.

4. The method of determining bearing preload by vibration measurement according to claim 1, further comprising rotating the bearing in a range from 100 rpm to 2000 rpm.

5. The method of determining bearing preload by vibration measurement according to claim 1, further comprising providing a clamping force that is preferably either less than or greater than the internal preload ideally achieves a more linear relationship for a mode between the bearing preload and a frequency at which the bearing is rotated.

6. The method of determining bearing preload by vibration measurement according to claim 1, further comprising measuring vibration of the outer ring with a laser, wherein the laser does not physically contact the outer ring.

7. The method of determining bearing preload by vibration measurement according to claim 1, further comprising providing the sensor as being one of a laser vibrometer, an accelerometer and a coil vibrometer.

8. The method of determining bearing preload by vibration measurement according to claim 1, further comprising identifying at least one mode in order to insure a minimum accuracy of the bearing preload determination.

9. The method of determining bearing preload by vibration measurement according to claim 1, wherein obtaining the ideally referenced graph is provided by at least one of a calibrated chart stored within a memory on board the computer workstation, by simulation and by measurement of known bearings, and by transfer function.

10. The method of determining bearing preload by vibration measurement according to claim 1, wherein optimizing signal quality is obtained by measuring vibration on a machined surface and on a non-rotating elements.

11. The method of determining bearing preload by vibration measurement according to claim 1, wherein the outer ring vibration at predetermined rotation rates is accomplished by measuring and recording at least one of a position, velocity and an acceleration movement.

12. The method of determining bearing preload by vibration measurement according to claim 1, wherein measuring a wheel bearing unit is done with a laser on the outer ring on one of an inboard or an outboard surface.

13. The method of determining bearing preload by vibration measurement according to claim 12, wherein these surfaces allow easy access to the surface with a distance laser unit even with complex loading and clamping devices.

14. A system for determining bearing preload by vibration measurement, the system comprises,
   a bearing having an inner ring, an outer ring, and at least two rows of rolling elements,
   the bearing being mounted on a mounting fixture that is disposed on a bearing noise and vibration tester, the mounting fixture having a rotating arbor attached thereto, the rotating arbor provided to rotate the inner ring of the bearing at predetermined rates, wherein the bearing rotation creates vibrational noise on the outer ring, the outer ring being fixed by a clamping and antirotation system in order to prevent the outer ring from rotating when the bearing inner ring is rotated, wherein the force that clamps the outer ring is preferably configured to be unequal to the internal bearing preload,
   a sensor is disposed proximate the outer ring of the bearing in order to measure and record the outer ring vibration, wherein the outer ring vibration is as at least one of a position, velocity and an acceleration movement at predetermined rotation rates,
   the bearing being rotated on the arbor at a speed of 700 rpm that is configured to excavate eigen-frequencies of the outer ring,
   the measured vibration data is transmitted from the laser to a computer workstation, the computer workstation providing a software analysis package, the software analysis package performing a numerical Fast Fourier Transform (FFT) of the data to transform it into a Frequency Domain,
   the spectral data from the FFT is analyzed with the computer workstation, the software analysis package employs a peak detection algorithm to determine the peaks of the amplitude data in the frequency domain, wherein the peaks are the various modes of the outer ring, the modes are sorted and the main or dominant modes are identified with the peak detection algorithm, the number of modes selected is based upon design selection, a numerical relationship is obtained for each mode between the resonance and the preload, wherein a polynomial curve is fit to data points or to a look up table, the mode relationships or graphed polynomial curves are compared to one or more references, wherein the one or more references for the bearing is an ideally referenced graph, wherein a match between the numerical relationships for each mode and the ideally referenced graph modes indicates a correct preload is determined.

15. The system for determining bearing preload by vibration measurement according to claim 14, further comprising the bearing being mounted in a wheel hub and the inner ring being rotated via the mounting studs.

* * * * *